United States Patent [19]

Inoue et al.

[11] Patent Number: 4,508,849

[45] Date of Patent: Apr. 2, 1985

[54] METHOD FOR PREPARATION OF CATALYST CARRIERS

[75] Inventors: Akira Inoue, Kawasaki; Shinji Takase; Yasuo Sekido, both of Yokohama; Masao Mori, Yokosuka; Tatsuki Kubo, Kawasaki, all of Japan

[73] Assignee: Nippon Oil Company, Limited, Tokyo, Japan

[21] Appl. No.: 609,136

[22] Filed: May 11, 1984

[30] Foreign Application Priority Data

May 12, 1983 [JP] Japan .................................. 58-81636

[51] Int. Cl.³ .......................... B01J 21/12; B01J 21/04
[52] U.S. Cl. ..................................... 502/263; 502/355; 502/407; 502/414; 502/439; 502/527
[58] Field of Search ................. 502/62, 232, 235, 238, 502/263, 402, 407, 414, 439, 527

[56] References Cited

U.S. PATENT DOCUMENTS

| | | | |
|---|---|---|---|
| 3,091,550 | 5/1963 | Doying | 502/62 X |
| 3,162,607 | 12/1964 | Burbidge et al. | 502/527 X |
| 3,467,602 | 9/1969 | Koester | 502/507 X |
| 3,679,605 | 7/1972 | Sanford et al. | 502/439 |
| 3,930,890 | 1/1976 | Dietz | 502/527 |
| 4,228,034 | 10/1980 | Butter et al. | 502/527 X |

FOREIGN PATENT DOCUMENTS 425419 10/1974 U.S.S.R. .............................. 502/402

*Primary Examiner*—Carl F. Dees
*Attorney, Agent, or Firm*—Stevens, Davis, Miller & Mosher

[57] ABSTRACT

Provided is a method for the preparation of alumina or silica-alumina catalyst carriers which comprises blending a precursor of alumina or silica-alumina carriers with polytetrafluoroethylene resin particles, warming the blend and subjecting the same to a compression and shearing operation in a blender, followed by drying and baking.

6 Claims, No Drawings

METHOD FOR PREPARATION OF CATALYST CARRIERS

BACKGROUND OF THE INVENTION

This invention relates to a method for the preparation of catalyst carriers. More particularly, it is concerned with a method for the preparation of silica or silica-alumina catalyst carriers.

It is well known that in the reaction in a heterogeneous system in which a solid catalyst with catalytic components supported on a carrier, there are involved diffusion process in the catalyst particles and absorption and desorption processes on the catalyst surfaces of the reactants and the products in addition to the surface chemical reaction process. In these processes, the reaction rate and the selectivity of the product are influenced by the structure of micropores in the catalyst carrier.

The structure of micropores in the catalyst carrier, therefore, should be adequate for diffusion of the reactants and the products in the catalyst particles.

As described above, structure of micropores in the catalyst carrier is an important element to consider in designing and optimumizing the catalyst for industrial use. However, technique for controlling the structure has not established.

This may be due to the fact that control of the structure of filled colloid particles, the precursor of the catalyst carrier, which is critical in determining the structure of micropores in the catalyst carrier, is difficult. The precursor of the catalyst carrier such as hydroxides and oxides, in general, exists in hydrated colloid state and agglomeration of the colloidal particles is influenced by too many factors, not only by the nature of the particles such as size, shape, distribution of the particle size, composition, form of bonding and thickness of the electric double layer but also by properties of the aqueous solution such as pH, nature and concentration of the electrolyte and viscosity and others.

Methods for improving the characteristics of the formed catalyst such as strength and porosity by adding an organic or inorganic fibrous substance to the catalyst material or the precursor thereof, or the carrier material or the precursor thereof followed by drying, baking and other operations are disclosed in publications such as Japanese Patent Laid Open Nos. 3304/1981 and 4404/1981. However, regarding the control of the structure and distribution of micropores in the porous substance, none of them refers to the possibility of controlling the structure and distribution of micropores in the porous substance by the nature of additives and the manner in which they are added and blended, although the fact that the openings are produced in the area occupied by the additive shrinked when dried or the one which disappeared when baked is referred to. When teflon is employed as the fibrous substance, the fibers are agglomerated and enlarged in the course of producing the alumina or silica-alumina catalyst carrier. Therefore, almost no effect is expected by the use of teflon for the control of the micropores.

SUMMARY OF THE INVENTION

It is an object of the present invention to provide a method for the preparation of alumina or alumina-silica catalyst carriers.

Other objects and advantages of the invention will become apparent from the descriptions herein below.

The above-mentioned objects of the invention are achieved by blending a precursor of alumina or alumina-silica carriers with polytetrafluoroethylene particles, warming the blend and then subjecting the same to a compression and shearing operation in a blender, followed by drying and baking.

DESCRIPTION OF THE PREFERRED EMBODIMENTS

The precursor of alumina or alumina-silica carrier as used in the present invention means the aqueous solutions, sols or gels of alumina or alumina-silica.

Any of the aqueous solutions of alumina or alumina-silica generally employed may be used. Illustrative is an aqueous solution containing a starting material for the synthesis of alumina hydroxide or a diluted solution of alumina hydroxide.

The sol or gel may be any of those generally used. Illustrative is amorphous alumina hydrate.

The amorphous alumina hydrate can be prepared by hydrolysis of an aluminum salt such as aluminum sulfate or aluminum nitrate or by hydrolysis of an alkali aluminate such as sodium aluminate with an acid or an aluminum salt.

The polytetrafluoroethylene resin (PTFE resin hereinbelow) particles used in the present invention, when subjected to a compression, shearing and stirring operation at a temperature higher than 20° C., the room temperature transition point, readily becomes fibrous to form arachnoid nets (fibrillation). The resin is powder particles having a specific gravity in the range between 2.13 and 2.20 and a particle size in the range between 210 and 2380$\mu$ and preferably between 350 and 840$\mu$. For example, Teflon K10-J manufactured by Hershaw which is powdery and Teflon K20-J manufactured by the same company which is in aqueous suspension (microparticles dispersed in water at a concentration of approximately 30%) are commercially available.

The method for the preparation of the carrier according to the invention is characterized by adding PTFE resin particles to a precursor of alumina or alumina-silica carrier in aqueous solution, sol or gel, blending the two and subjecting the blend to a compression, shearing and stirring operation while warming the same to a temperature in the range from 40° to 90° C. and preferably from 50° to 80° C., followed by drying and baking.

In preparing the alumina by dropwise adding an aqueous solution of aluminum sulfate to an aqueous solution of sodium aluminate, for example, an alumina with satisfactory physical properties can be prepared by adding a predetermined amount of PTFE resin particles to an aqueous solution of aluminum sulfate. Addition of PTFE resin particles to a precursor of the catalyst carrier is also effective, but the addition to the aqueous solution containing a starting material as illustrated above is most desirable. The ratio of the PTFE resin particles to the alumina or silica-alumina carrier precursor to be mixed as described above is in the range from 0.1 to 30% by weight and preferably from 0.5 to 15% by weight on the basis of the dried precursor.

The blender that is used for the compression and shearing of the blend may be any of those apparatus which are capable of simultaneously running the operations of "pulverizing", "blending", "stirring" and "kneading" in dry or wet state. For example, it may be an automatic mortar, a screw kneader, a ball mill or a stirrer with rotating blades.

The compression and shearing actions mentioned above represents actions by which agglomerates of powder particles are dissociated and pulverized through mutual sliding and collision of the particles caused by velocity distribution within groups of the powder particles as well as through compression and stretching of the agglomerates between the top of the stirring blade and the bottom surface or the wall surface. The drying mentioned above is carried out at a temperature in the range from 100° to 200° C. for a period in the range from 1 to 24 hours, and the baking at a temperature in the range from 500° to 800° C. for a period in the range from 2 to 10 hours.

Mechanism by which the structure of micropores in the catalyst carrier is controlled in the method for the preparation of catalyst carriers according to the present invention has not been clarified.

In the case where PTFE resin particles are added to an aqueous solution containing, for example, $Al_2(SO_4)_3$, the starting material for the synthesis of aluminum hydroxide, a precursor of the catalyst carrier, it is suggested that formation of aluminum hydroxide and development of fibrils of PTFE resin proceed simultaneously to enhance the interaction between the two thereby influencing the structure of filled or agglomerated colloid particles with a result that structure and distribution of the micropores are changed.

Examples of the invention are shown below together with comparative examples. The examples are given to illustrate but not to limit the invention.

EXAMPLE 1

To 798 l. of ion-exchanged water was added 1,932 Kg. of an aqueous solution of sodium aluminate containing 11.3% of $Na_2O$ and 22% of $Al_2O_3$. After stirred, 7.5 Kg. of 50% aqueous solution of gluconic acid was added, and the mixture was warmed to 60° C. To the resulting solution was added with stirring in an automatic mortar 8.4% aqueous solution of aluminum sulfate containing 0.13% of Teflon K10-J (particle size of 500μ) to a pH of 7.2. The amount required was 3,600 Kg. After the neutralization, the mixture was allowed to stand for 1 hour and then placed in a vacuum filter. The filter cake was washed with 0.2% aqueous ammonia thereby removing a greater portion of the $Na_2O$ and $SO_4$ to obtain 1,215 Kg. of a filter cake. Another trial preparation of the filter cake was run with an amount of added Teflon K10-J changed to 0.013%. A portion of each cake was separated and, after adjusting the humidity, was molded by extrusion by means an extruder to give cylinders 1.5 mm in diameter.

The molded alumina product obtained from the extrusion was dried at 130° C. for 3 hours and measured by X-ray diffraction for particle size and teflon content (see Table 1). Then, the product was baked at 550° C. for 3 hours. The product baked at 550° C. contained neither pseudo-boehmite nor teflon as measured by X-ray refraction, which indicated the crystal form of gamma-alumina.

EXAMPLE 2

A portion of the filter cake obtained in Example 1 was separated, dried at 130° C. for 3 hours and, after the humidity adjustment, molded by extrusion by means of an extruder to give cylinders 1.5 mm in diameter. The molded alumina product obtained from the extrusion was dried at 130° C. for 3 hours and measured by X-ray diffraction for particle size and teflon content (see Table 1).

The product was then baked at 550° C. for 3 hours. The product baked at 550° C. contained neither pseudo-boehmite nor teflon as measured by X-ray refraction, which indicated the crystal form of gamma-alumina.

EXAMPLE 3

To 425 cc of ion-exchanged water was added 212.2 g of an aqueous solution of sodium aluminate containing 11.3% of $Na_2O$ and 18% of $Al_2O_3$. After stirred, 7.5 g of 50% aqueous solution of gluconic acid was added, and the mixture was warmed to 60° C. To the resulting mixture was added 8.4% aqueous solution of aluminum sulfate to a pH of 7.2. The amount required was 780 g. After the neutralization, the mixture was allowed to stand for 1 hour and then placed in a vacuum filter. The filter cake was washed with 0.2% aqueous ammonia thereby removing a greater portion of the $Na_2O$ and $SO_4$ to obtain 243 g. of a filter cake.

To the filter cake was added 12.8 g. of Teflon K10-J (a particle size of 500μ), and the mixture was kneaded in an automatic mortar at room temperature for 6 hours. The kneaded material, after adjusting the humidity, was molded by extrusion by means of an extruder to give cylinders 1.5 mm in diameter.

The molded alumina product thus obtained was dried at 130° C. for 3 hours and measured by X-ray diffraction for particle size and teflon content (see Table 1). The product was then baked at 550° C. for 3 hours. The product baked at 550° C. contained neither pseudo-boehmite nor teflon as measued by X-ray diffraction, which indicated the crystal form of gamma-alumina.

EXAMPLE 4

A portion of the 6 hour-kneaded product obtained in the mortar was separated and dried at 130° C. for 3 hours. After the humidity adjustment, it was molded by extrusion by means of an extruder to give cylinders 1.5 mm in diameter. The molded alumina product thus obtained was dried at 130° C. for 3 hours and measured by X-ray diffraction for particle size and teflon content (see Table b 1). The product was further baked at 550° C. for 3 hours. The baked product contained neither pseudo-boehmite nor teflon as measured by X-ray diffraction, which indicated the crystal form of gamma-alumina.

COMPARATIVE EXAMPLE 1

To 500 cc of ion-exchanged water was added 200 g. of an aqueous solution of sodium aluminate containing 11.3% of $Na_2O$ and 18% of $Al_2O_3$. After stirred, to the mixture was added 7.5 g. of 50% aqueous solution of gluconic acid, and the resulting mixture was warmed to 60° C. To the solution thus obtained was added 8.4% aqueous solution of aluminum sulfate warmed to 55° C. to a pH of 7.2. The amount required was 750 g. The preparation was allowed to stand for 1 hour and then placed in a vacuum filter. The filter cake was washed with 0.2% aqueous ammonia to obtain an alumina cake.

A portion of the alumina cake was separated and dried at 130° C. for 3 hours. After the humidity adjustment, the product was molded by extrusion by means of an extruder to give cylinders 1.5 mm in diameter. The cylinders, after allowed to stand overnight, were dried at 130° C. for 3 hours and measured by X-ray diffraction for particle size (see Table 1). The dried cylinders were further baked at 550° C. for 3 hours. No pseudo-boehmite was observed as measured by X-ray diffraction, which indicted the crystal form of gamma-alumina.

COMPARATIVE EXAMPLE 2

To 425 cc of ion-exchanged water was added 212.2 g. of an aqueous solution of sodium aluminate containing 11.3% of $Na_2O$ and 18% of $Al_2O_3$. After stirred, to the mixture was added 7.5 g. of 50% aqueous solution of gluconic acid. To the resulting solution warmed to 60° C. added 12.8 g. of teflon fibers (a fiber diameter of $2\mu$ on average and a fiber length of 3 mm on average). After stirred, 8.4% aqueous solution of aluminum sulfate warmed to 55° C. was added to the mixture to a pH of 7.2. The amount required was 780 g. After the neutralization, the resulting mixture was allowed to stand for 1 hour and placed in a vacuum filter. The filter cake was washed with 0.2% aqueous ammonia.

The filter cake thus obtained was kneaded in an automatic mortar at room temperature for 6 hours. Humidity was then adjusted, and the product was molded by extrusion by means of an extruder to give cylinders 1.5 mm in diameter.

The molded alumina from the extrusion was dried at 130° C. for 3 hours and measured by X-ray diffraction for particle size and teflon content (see Table 1). The dried cylinders were further baked at 550° C. for 3 hours. The product baked at 550° C. contained neither pseudo-boehmite nor teflon as measured by X-ray diffraction, which indicated at the crystal form of gamma-alumina.

The alumina products obtained in Comparative Examples 1 and 2 and Examples 1-4 were measured for physical properties, which are shown in Table 1.

effect by the use of teflon fibers; on the other hand, decrease in strength is observed.

From Example 1 as compared with Comparative Example 1, it is seen that the average diameter of micropores is enlarged, and moreover, distribution of the diameter of micropores is shifted to the larger portions.

It is indicated that the average diameter of micropores is further enlarged by the addition of 10% by weight of teflon particles.

The strength is high enough for practical use in every example, being higher than the strengths in the comparative examples.

What is claimed is:

1. Method for the preparation of alumina or silica-alumina catalyst carriers which comprises blending a precursor of alumina or silica-alumina carriers with polytetrafluoroethylene resin particles, warming the blend and subjecting the same to a compression and shearing operation in a blender, followed by drying and baking.

2. The method according to claim 1 wherein the polytetrafluoroethylene particles have a particle size in the range from 210 to $2380\mu$.

3. The method according to claim 1 wherein the polytetrafluoroethylene particles are added in a proportion in the range from 0.1 to 30% by weight on a dry basis on the basis of the weight of said precursor.

4. The method according to claim 1 wherein said precursor is an aqueous solution, sol or gel of alumina or silica-alumina.

5. The method according to claim 1 wherein the temperature for the warming is in the range from 40 to 90° C.

6. The method according to claim 1 wherein the

TABLE 1

|  | Comparative Example 1 | Comparative Example 2 | Example 1 | Example 2 | Example 3 | Example 4 |
| --- | --- | --- | --- | --- | --- | --- |
| Teflon content (wt %) | 0 | 10 | 1 | 10 | 10 | 10 | 10 |
| Surface area (m²/g) | 305 | 294 | 218 | 210 | 202 | 209 | 234 |
| Volume of micropores (cc/g) | 0.51 | 0.51 | 0.60 | 0.80 | 0.84 | 0.68 | 0.76 |
| Average diameter of micropores (Å) | 67 | 76 | 110 | 152 | 170 | 120 | 130 |
| Diameter of crystallite of pseudo-boehmite (Å)* | 46 | 50 | 105 | 148 | 167 | 118 | 129 |
| Strength (Kg/mm) | 0.60 | 0.40 | 0.80 | 0.68 | 0.72 | 0.78 | 0.78 |

*Determined from the half-width $2\theta = 38.4°$ according to Debye-Scherrer equation.

The physical properties of the alumina obtained in Comparative Example 2 are close to those obtained in Comparative Example 1. This indicates that there is no polytetrafluoroethylene particles are subjected to the compression and shearing operation for a period of time sufficient to transform the particles to fibrils.

* * * * *